United States Patent Office
3,444,026
Patented May 13, 1969

3,444,026
ADHESIVE PROPERTIES OF AMINE TERMINATED POLYAMIDE RESINS
Dwight E. Peerman, Minneapolis, Minn., assignor to General Mills, Inc., a corporation of Delaware
No Drawing. Filed Jan. 12, 1966, Ser. No. 520,092
Int. Cl. C09j 3/12
U.S. Cl. 156—331                                           10 Claims

ABSTRACT OF THE DISCLOSURE

There is disclosed a method of adhesively bonding non-leather materials such as rubber, neoprene, Neolite and chlorosulfonated polyethylene to itself as well as to other substrates, by the use of amine-terminated polymeric fat acid polyamides.

---

This invention relates to a method of adhesively bonding various non-leather soling materials which are particularly hard to bond such as rubber (natural or synthetic), neoprene (a polymer of chloropentadiene), Neolite, and chlorosulfonated polyethylene, by the use of an adhesive consisting of an amine terminated polymeric fat acid polyamide. The invention relates to the bonding of such non-leather soling materials to each other as well as to other non-soling material substrates.

While polymeric fat acid polyamides are useful as adhesives generally, it has been discovered that polyamides of this type which are amine terminated provide unexpected adhesive properties with non-leather soling materials generally employed in shoe manufacture. The adhesive composition may be applied by solvent or hot melt techniques. However, the hot melt technique is generally employed. By hot melt technique is meant the adhesive is heated to slightly above its melting or softening point at which time the adhesive is in a somewhat flowable condition and may be applied to the portions to be adhesively bonded together. The adhesive, upon cooling, solidifies and hardens and provides a bond between the two materials bonded together.

The adhesives employed in the present invention are the amine terminated polymeric fat acid polyamides. By "amine terminated" is meant that the amine number of the polyamide resin exceeds the acid number. The amine number and acid number are defined as milligrams of KOH which correspond to one gram of amine or acid as set forth in "Polyamide Resins" by Don E. Floyd, p. 49, Reinhold Publishing Corporation, copyright 1958. Significant improvement in adhesion is noted even where the amine number exceeds the acid number by as little as 0.1 In addition, in general the amine number is also less than 25.

The adhesives are polyamides of a diamine and a polymeric fat acid. Mixtures of two or more diamines may be employed. In addition, other copolymerizing acids, either monocarboxylic or dicarboxylic acids, may be employed to modify the properties of the polyamide such as melting point, viscosity and the like.

The term polymeric "fat acid" as used herein refers to naturally occurring and synthetic monobasic aliphatic acids having hydrocarbon chains of 8 to 24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimeric fat radical."

The saturated, ethylenically unsaturated, and acetylenically unsaturated fat acids are generally polymerized by somewhat different techniques, but because of the functional similarity of the polymerization products, they are all generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as captylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include clays, di-t-butyl peroxide, boron trifluoride and other Lewis acids, anthraquinone, sulfur dioxide and the like. Suitable monomers include the branched and straight chain, poly and mono ethylenically unsaturated acids such as 3-octenoic acid, 11-dodecenoic acid, linderic acid, lauroleic acid, myristoleic acid, tsuzuic acid, palyitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. Acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful for the preparation of the polymeric fat acids. Suitable examples of such materials include 10-undecynoic acid, tariric acid, stearolic acid, behenolic acid and isamic acid.

Because of their ready availability and relative ease of polymerization, oleic acid and linoleic acid are the preferred starting materials for the preparation of the polymeric fat acids. Mixtures of these two acids are generally found in tall oil fatty acids which are, accordingly, the common source for polymerization to polymeric fat acids commercially available. In place of the acids themselves, the equivalent amide forming derivatives thereof may be employed, such as the chlorides or the alkyl and aryl esters thereof, such as the dimethyl, diethyl and diphenyl esters. Where the alkyl esters are employed generally, the alkyl group contains from 1 to 8 carbon atoms.

The polyamides with which this invention is primarily concerned are those prepared from polymeric fat acids having a dimer acid content in excess of 80% by weight and preferably in excess of 90% by weight. This invention might also, however, have application to products where a lower dimeric fat acid content is employed but where, due to the unique nature of the specific diamine employed, the product has properties substantially the same as those prepared from polymeric fat acids having the higher dimeric fat acid contents mentioned above.

As earlier indicated, small amounts of monomeric monocarboxylic acids may be present. In the earlier discussion of polymeric fat acids, it was apparent that this is a mixture of monomeric, dimeric and trimeric or higher polymeric forms. Accordingly, there is generally present therein some monomeric monocarboxylic acids which contain from 8 to 22 carbon atoms. Other monocarboxylic acids might be present by addition, such as acetic acid, propionic acid and the like. In general, these acids are monomeric, aliphatic hydrocarbon, monocarboxylic acids having from 2 to 22 carbon atoms.

The copolymerizing dicarboxylic acids generally employed may be aliphatic, cycloaliphatic or aromatic dicarboxylic acids. These acids may be defined ideally by the formula

HOOC—R—COOH where R is an aliphatic, cycloaliphatic or aromatic hydrocarbon radical having from 2 to 20 carbon atoms. Illustrative of such acids are adipic, sebacic, suberic, succinic, glutaric, isophthalic, terephthalic and phthalic acids.

The diamines generally employed may be aliphatic, cycloaliphatic or aromatic diprimary diamines which may be ideally represented by the formula $H_2NR'NH_2$ where R' is an aliphatic, cycloaliphatic or aromatic hydrocarbon radical having from 2 to about 40 carbon atoms. Representative of such compounds are:

ethylene diamine
1,2-diamino propane
1,2-diamino butane
1,3-diamino propane
1,3-diamino butane
tetramethylene diamine
pentamethylene diamine
hexamethylene diamine
decamethylene diamine
octadecamethylene diamine
metaxylylene diamine
paraxylylene diamine
cyclohexylene diamine
bis(aminoethyl) benzene
cyclohexyl bis(methyl amine)
diamino-dicyclohexyl methane
methylene dianiline The diamine may be employed alone or mixtures of two or more may be employed. The preferred diamines are the alkylene diamines in which the alkylene group has from 2–6 carbon atoms and mixtures thereof with the diamine of dimerized $C_{18}$ fatty acids. The diamine, referred to as "dimer diamine" or "dimeric fat diamine" is prepared from dimeric fat acids. Relatively pure dimeric fat acids, sometimes called dimerized fat acids, can be distilled from commercially available polymeric fat acids which, as indicated earlier, are a mixture of monomeric, dimeric, trimeric and higher polymeric forms. The relatively pure dimeric fat acids are reacted with ammonia to obtain the corresponding dinitrile which is then hydrogenated to the corresponding dimer diamine. Commercially available polymeric fat acids are generally prepared by polymerizing tall oil fatty acids, the tall oil fatty acids containing a mixture of oleic and linoleic acids. The dimer diamine employed herein is prepared from the dimeric fat acid fraction obtained by distillation of commercially available polymeric fat acids in the manner described below. It is understood, however, that diamines prepared from other polymeric fat acids may also be employed, the preferred products being prepared from polymeric fat acids prepared by polymerizing the 16 to 20 carbon atom monocarboxylic, aliphatic hydrocarbon acids, with the 18 carbon atom acids being the most common.

The dimeric fat acid is converted to the corresponding dinitrile by reacting the dimeric fat acid with ammonia under nitrile-forming conditions. The details of this reaction are set forth in Chapter 2 of "Fatty Acids and Their Derivatives" by A. W. Ralston, John Wiley and Sons, Inc., New York (1948). The dinitrile is then purified by vacuum distillation or other suitable means. After such purification, the dinitrile is then hydrogenated to form the corresponding diamine which is also purified by vacuum distillation or other suitable means. For purposes of convenience, the dimer diamine employed in the examples to follow is the dimer diamine prepared from the dimeric fat acid fraction obtained from polymerized tall oil fatty acids.

Ideally this dimer diamine may be represented by the formula:

$H_2NR'''NH_2$ where R''' is the dimeric fat radical of a polymerized fat acid, said fat acid being a monocarboxylic, aliphatic acid having hydrocarbon chains of from 8 to 24 carbon atoms.

The polyamides are prepared by reacting the acid components with the diamine components at conventional amidification temperatures (preferably in the range of 100 to 300° C.) with removal of the water of reaction (or the alcohol, if esters are employed). The reactants are employed in amounts so that the final product possesses an amine number which is greater than the acid number. Accordingly, an excess of diamine is employed. This excess may be slight, however, inasmuch as improved results are obtained with products wherein the amine number preferably exceeds the acid number by a value of 0.1. Where a copolymerizing acid is employed, the acid is preferably employed up to an amount of 50 equivalent percent of the total carboxyl component. Where the dimer diamine is employed, in admixture with other diamines, it is employed in an amount of up to about 70 equivalent percent of the total amine component, preferably between 2 to about 40 amine equivalent percent.

The invention can best be illustrated by means of the following examples.

EXAMPLE I

Various polyamide resins (including acid terminated products for comparison) were prepared and evaluated as adhesive bonding neoprene to steel (as a non-soling material substrate). The reactants were placed into a reactor equipped with a thermometer, stirrer, and distillation head. The contents were then heated under a nitrogen blanket over a two hour period to 250° C. The temperature was maintained at 250° C. for an additional four hours, the first two hours under nitrogen and the last two hours under vacuum. The resulting product was then allowed to cool. The reactants and products can be seen from the following:

|  | Resin A (acid terminated) | Resin A (amine terminated) | Resin B (acid terminated) | Resin B (amine terminated) |
|---|---|---|---|---|
| Reactants: |  |  |  |  |
| Polymeric fat acid (equivalents) | 3.07 | 3.07 | 3.50 | 3.50 |
| Dimeric fat diamine (equivalents) | 0.80 | 0.793 | | |
| Ethylene diamine (equivalents) | 2.30 | 2.35 | 3.10 | 3.90 |
| Product: |  |  |  |  |
| Amine No | 2.7 | 5.1 | 0.7 | 15.7 |
| Acid No | 3.6 | 2.4 | 11.7 | 1.9 |
| Ball & ring softening point (° C.) | 97 | 99 | 102 | 103 |

The polymeric fat acids employed above were polymerized tall oil fatty acids having the following analysis:

Monomer (by weight) [1] _____percent___ 2.3
Intermediate (by weight) [1] _____do____ 2.4
Dimer (by weight) [1] _____do____ 92.5
Trimer (by weight) [1] _____do____ 2.8
Acid No. _____ 191.8
Saponification No. _____ 198.3
Iodine Value _____ 128.5

[1] By gas-liquid chromatography.

The dimer diamine or dimeric fat diamine employed was prepared by sparging polymerized tall oil fatty acids with ammonia at 300° C., at a pressure of 10–20 p.s.i. for about 3½ hours using 0.1% zinc oxide catalyst. The resulting nitrile product had an acid number of 0.7 and analyzed at 92.0% nitrile by weight. The percent monomeric nitrile was 1.3, the percent dimeric nitrile was 64.0 and percent trimeric (and higher polymeric) nitrile was 24.0%. The percent unsaponifiables (unsap.) was 1.3 and the Gardner Color was 11–12. After distillation, the product analyzed as follows:

| | |
|---|---|
| Acid No. | 0.4 |
| Unsap. percent | 0.8 |
| Monomeric nitrile do | 1.1 |
| Dimeric nitrile do | 89.4 |
| Trimeric nitrile do | 9.1 |

This nitrile product was hydrogenated using three additions of Raney nickel at 2% each addition. The temperature was maintained near 150° C. at 380–400 p.s.i. hydrogen pressure for about 11½ hours. The resulting diamine had the following analysis:

| | |
|---|---|
| Amine No. | 184.8 |
| Primary amine percent | 85.3 |
| Secondary amine do | 10.2 |
| Secondary and tertiary amine do | 10.6 |
| Gardner color | 8–9 |
| Iodine value (I.V.) | 94.3 |

After distillation, the product had the following analysis:

| | |
|---|---|
| Amine No. (Total) | 204.7 |
| Secondary and tertiary amine percent | 0.3 |
| Monomeric amine do | 0.3 |
| Dimeric amine do | 97.1 |
| Trimeric amine do | 2.6 |
| Gardner color | 4–5 |

For evaluation as adhesives the resins prepared above were dissolved in a 50/50 mixture of xylene and cellosolve (ethoxy ethanol) in a 20% solids concentration. The substrates upon which the resins were evaluated were (1) ¼ in. x 6¼ in. x 5⅝ in. sections of Neoprene (a polymer of chloropentadiene) and (2) 0.006 in. x 6¼ in. x 5⅝ in. sections of can-makers quality blackplate (steel). The test specimens were prepared by measuring a 2½ inch lap width along the length of each of the substrats and applying to one of the substrates, by brush, a film of the adhesive solution. The coated sections were placed in a forced draft oven at 110° C. for ½ hour to evaporate the solvent. This resulted in a dry film thickness of 1 to 1½ mils. The bonds were made in a press at 130° C. and 330 p.s.i. The bonded sections were then cut into 1 inch by 6¼ inch specimens. The peel strength in lbs./in. was then measured by gripping the free ends of the specimen in the jaws of an Instron Tester and separating them at 2 inches per minute. The load in pounds is recorded on a chart recorder, the maximum load at failure being designated the peel strength. The results were as follows:

| Adhesive resin | Type of failure | Peel strength lbs./in. |
|---|---|---|
| A (acid terminated) | Adhesive to neoprene | 2.9 |
| A (amine terminated) | Cohesive in neoprene | 10.5* |
| B (acid terminated) | Adhesive to neoprene | 0.5 |
| B (amine terminated) | Cohesive in neoprene | 13.0* |

* These values reflect point at which neoprene itself failed—not the adhesive.

EXAMPLE II

Various resins were evaluated as adhesives for bonding Neolite to Neolite. Neolite is a blend of natural and/or synthetic rubber together with fillers, coloring agents, and modifiers. The resins were as follows:

(1) Resin A (amine terminated) of Example I, (2) A resin, acid terminated, prepared in the same manner as Example I, the ingredients being:

| | Equivalents |
|---|---|
| Polymeric fat acids (same as Example I) | 3.53 |
| Dimeric fat diamine (same as Example I) | 0.88 |
| Ethylene diamine | 2.55 |

(3) Resin B (amine terminated) of Example I, (4) An acid terminated resin prepared with the same reactants as Resin B but having an acid No. of 9.9 and an amine number of 1.2.

The substrates for resins (1) and (2) above were 1 inch by 6 inch by ⅛ inch Compo Rubber Soling strips (similar in composition to Goodyear's Neolite but not necessarily identical). For resins (3) and (4) the substrates were 1 inch by 6 inch by ⅛ inch Goodyear Neolite strips. Resins (1) and (2) were applied as a 20% solids solution in a 50/50 mixture of xylene and Cellosolve. Resins (3) and (4) were applied by a hot melt technique.

In the solution technique, the substrates were marked to indicate a ½ inch overlap which was cleaned with xylene. The adhesive was applied to the Neolite as in Example I and the solvent removed by drying in an oven at 100° C. for ½ hour to provide a film thickness of 1.5 to 2.0 mils. To this strip of rubber soling was bonded another strip of rubber soling by using a press under at 130° C. With resins (3) and (4) a conventional hot melt technique was employed making the bonds in a press under pressure at 150° C.

The peel strength was measured providing the following results:

| Adhesive resin | Type of failure | Peel strength lbs./in. |
|---|---|---|
| (1) Resin A (amine term.) | Cohesive in the rubber | 37.3 |
| (2) Acid term | Adhesive to the rubber | 27.0 |
| (3) Resin B (amine term.) | Adhesive to Neolite | 35.0 |
| (4) Acid term | Adhesive to Neolite | 4.5 |

The foregoing illustrates that the amine terminated products unexpectedly provide improved results in the bonding of soling materials such as neoprene and Neolite. In the specific examples above the amines employed were ethylene diamine and mixtures thereof with dimeric fat diamine. These improved results, however, are achieved with the use of other diamines to provide amine terminated products such as diaminopropane, diaminobutane, hexamethylene diamine, octadecamethylene diamine, xylylene diamine, cyclohexylene diamine, bis (aminoethyl) benzene, cyclohexyl bis (methylamine), methylene dianiline or mixtures thereof. The diamines accordingly may be aliphatic, cycloaliphatic, or aromatic diamines. The preferred diamines are the alkylene diamines having an alkylene group containing from 2 to 6 carbon atoms and mixtures thereof with the diamine of dimerized $C_{18}$ fatty acids.

The improvement is obtained in bonding soling materials such as rubber (natural or synthetic) and chlorosulfonated polyethylene. The soling material may be cellular or non-cellular. Because of the non-uniformity of the cellular materials the test results in a peel strength test are not always uniform and it is generally necessary to test the adhesive properties on non-cellular materials. However, with relatively uniform cellular materials the improvement in adhesive properties can be seen from the peel strength test.

To further illustrate the invention, the adhesive properties to various soling materials were studied. The soling materials were as follows:

Standard Cement Liner (Neolite) (Goodyear Tire and Rubber Co.).—Natural and/or synthetic rubber based soling Neoprene 1001 (Seilon Shoe Products Co.).—Elastomer of polymers of 2-chloropentadiene-1,3

Hypalon G (Quabaug Rubber Co.).—Chlorosulfonated polyethylene

Hycar (O'Sullivan Rubber Co.).—Butadiene/acrylonitrile rubber

GRS (O'Sullivan Rubber Co.).—Styrene-butadiene rubber, 75 butadiene/25 styrene copolymer (same as Buna-S)

EXAMPLE III

Two resins similar to resin A of Example I were prepared using the same procedure of Example I employing the same polymeric fat acid and dimeric fat diamine of Example I.

Both acid and amine terminated products were prepared using the reactants and providing the following products as indicated:

| Resin | C | D |
|---|---|---|
| Ingredients: | | |
| Polymeric fat acid (equiv.) | 3.43 | 9.21 |
| Dimeric fat diamine (equiv.) | 0.88 | 2.379 |
| Ethylene diamine (equiv.) | 2.55 | 7.05 |
| Properties: | | |
| Acid number | 4.8 | 2.8 |
| Amine number | 1.6 | 4.0 |
| Ball & ring softening point, °C | 106 | 98 |

The improvement in peel strength of resin D (the amine terminated product) in comparison with resin C (the acid terminated product) on various soling materials can be seen from the following:

| | Peel strength (lbs./in.) | |
|---|---|---|
| Resin | C | D |
| Soling material: | | |
| Standard cement liner (neolite) | 15.4 | 27.0 |
| Neoprene 1001 | 63.0 | 65.0 |
| Hycar | 8.5 | 17.0 |
| GRS | 16.0 | 19.0 |

EXAMPLE IV

Resins similar to C and D of Example III were prepared in the same manner as Example I but with the inclusion of a copolymerizing acid which provided an increased softening point. The dimeric fat diamine employed was the same as in Example I. The polymeric fat acid employed was polymerized tall oil fatty acids having the following analysis: [1]

| | Percent |
|---|---|
| Monomer (by weight) | 0.6 |
| Intermediate (by weight) | 2.1 |
| Dimer (by weight) | 96.1 |
| Trimer (by weight) | 2.4 |

Both acid and amine terminated resins were prepared using the reactants and providing the products as indicated:

| Resin | E | F |
|---|---|---|
| Ingredients: | | |
| Polymeric fat acid (equiv.) | 2.5 | 3.025 |
| Adipic acid (equiv.) | 0.375 | 0.393 |
| Dimeric fat diamine (equiv.) | 0.703 | 0.887 |
| Ethylene diamine (equiv.) | 2.088 | 2.634 |
| Properties: | | |
| Acid number | 6.0 | 2.4 |
| Amine number | 1.0 | 5.5 |
| Ball & ring softening point, °C | 149 | 145 |

The improvement in peel strength of resin F (the amine terminated product) in comparison with resin E (the acid terminated product) on various soling materials can be seen from the following:

| | Peel strength (lbs./in.) | |
|---|---|---|
| Resin | E | F |
| Soling material: | | |
| Standard cement liner (neolite) | 13.8 | 24.1 |
| Neoprene 1001 | 38.0 | 61.5 |
| Hypalon G | 28.0 | 38.5 |
| Hycar | 6.3 | 21.8 |
| GRS | 12.0 | 20.5 |

[1] By gas-liquid chromatography.

EXAMPLE V

In order to illustrate that improvement is obtained when the amine number only slightly exceeds the acid number, two resins, acid terminated and amine terminated were prepared and evaluated. The resins were prepared in the same manner as Example I using the following reactants and providing the products indicated.

| Resin | G | H |
|---|---|---|
| Ingredients: | | |
| Polymeric fat acids (equiv.)* | 3.07 | 3.50 |
| Dimeric fat diamine (equiv.)* | 0.793 | 0.75 |
| Ethylene diamine (equiv.) | 2.30 | 2.75 |
| Properties: | | |
| Amine number | 3.3 | 3.9 |
| Acid number | 3.2 | 3.1 |
| Ball & ring softening point, °C | 100 | 110 |

*Same as Example I.

The improvement in peel strength of resin G (the amine terminated product) in comparison with resin H (the acid terminated product) on various soling materials can be seen from the following:

| | Peel strength (lbs./in.) | |
|---|---|---|
| Resin | G | H |
| Soling material: | | |
| Standard cement liner (neolite) | 31.4 | 17.6 |
| Neoprene 1001 | 61.2 | 35.0 |
| GRS | 29.9 | 24.0 |

It can be seen from the foregoing Example V that unexpected improvement results from the use of an amine terminated resin where the amine number exceeds the acid number by as little as 0.1. Example I illustrates a product where the amine number is about 8 times the acid number. In general, the amine number preferably will be less than 25.0 and preferably exceed the acid number by at least 0.1. In addition, the examples illustrate that the non-leather soling material can be bonded to other substrates which include the material itself as well as non-soling material substrates such as metals.

It is to be understood that the invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property is claimed are defined as follows:

1. A method of adhesively bonding a material selected from the group consisting of natural rubber, synthetic rubber, chloropentadiene polymers and chlorosulfunated polyethylene which comprises interposing an adhesive between said material and another substrate, said adhesive composition comprising the amine-terminated polyamide from the reaction of a diamine and a polymeric fat acid having a dimeric fat acid content greater than 80% by weight, wherein the amine number of said polyamide is less than 25 and exceeds the acid number of said polyamide by at least 0.1.

2. A method as defined in claim 1 wherein said polyamide is the condensation product of polymerized tall oil fatty acids having a dimeric fat acid content greater than 90% by weight and said diamine is ethylene diamine.

3. A method as defined in claim 1 wherein said polyamide is the condensation product of polymerized tall oil fatty acids and a mixture of ethylene diamine and the diprimary diamine of the formula $H_2NR'''NH_2$ where $R'''$ is the dimeric fat radical of polymerized fat acid, said fat acid being a monocarboxylic aliphatic acid having a hydrocarbon chain of from 8 to 24 carbon atoms.

4. A method as defined in claim 6 wherein $R'''$ is the dimeric fat radical of polymerized tall oil fatty acids.

5. A method as defined in claim 3 wherein said diprimary diamine comprises up to about 70 equivalent percent of the total amine component of the mixture.

6. A method as defined in claim 1 wherein said polyamide is the condensation product of polymerized tall oil fatty acids, adipic acid, ethylene diamine and a diprimary diamine of the formula $H_2R'''NH_2$ where $R'''$ is the dimeric fat radical of polymerized tall oil fatty acids.

7. A method of adhesively bonding a material selected from the group consisting of natural rubber, synthetic rubber, chloropentadiene polymers and chlorosulfonated polyethylene which comprises interposing between a surface of said material and a surface of another substrate an adhesive composition comprising the amine terminated polyamide from the reaction of:
(a) from 50 to 100 equivalent percent of a polymeric fat acid having a dimeric fat acid content greater than 80% by weight
(b) from 0 to 50 equivalent percent of a copolymerizing dicarboxylic acid of the formula

HOOC—R—COOH where R is selected from the group consisting of aliphatic, cycloaliphatic and aromatic hydrocarbon radicals having from 2 to 20 carbon atoms and
(c) a diprimary diamine of the formula $H_2NR'NH_2$ where R' is selected from the group consisting of aliphatic, cycloaliphatic and aromatic hydrocarbon radicals having from 2 to 40 carbon atoms and mixtures thereof
wherein the amine of said polyamide is less than 25 and exceeds the acid number of said polyamide by at least 0.1.

8. A method as defined in claim 7 wherein a mixture of diamines is employed, which mixture comprises from 30 to 98 equivalent percent of an alkylene diamine in which the alkylene radical has from 2 to 6 carbon atoms and from 2 to 70 equivalent percent of a diamine of the formula $H_2NR''''NH_2$ where R'''' is the dimeric fat radical of a polymerized fat acid, said fat acid being a monocarboxylic, aliphatic acid having a hydrocarbon chain of from 8 to 24 carbon atoms.

9. A method as defined in claim 7 wherein said polymeric fat acid is polymerized tall oil fatty acids, said copolymerizing acid is adipic acid and said diprimary diamine is ethylene diamine.

10. A method as defined in claim 8 wherein said polymeric fat acid is polymerized tall oil fatty acids, said copolymerizing acid is adipic acid, said alkylene radical is —$CH_2\ CH_2$— and R''' is the dimeric fat radical of polymerized tall oil fatty acids.

References Cited

UNITED STATES PATENTS

| | | | |
|---|---|---|---|
| 2,450,940 | 10/1948 | Cowan | 260—404.5 |
| 2,630,397 | 3/1953 | Cowan | 260—404.5 |
| 2,867,592 | 1/1959 | Morris et al. | 260—18 |
| 2,955,951 | 11/1960 | Aelony | 106—287 |
| 3,239,545 | 3/1966 | Rogier | 260—404.5 |
| 3,242,141 | 3/1966 | Vertnik et al. | 260—78 |
| 2,840,264 | 6/1958 | Groves | 220—81 |
| 2,379,413 | 7/1945 | Bradley | 260—404.5 |

OTHER REFERENCES

Emery Industries, Inc. Carew Tower, Cincinnati, Ohio, Development Product Bulletin No. 69, "Emery 3079S, Polymerized Fatty Acid, 4 pages, October 1956.

EARL M. BERGERT, *Primary Examiner.*

C. B. COSBY, *Assistant Examiner.*

U.S. Cl. X.R.

161—227; 260—18, 21, 404.5

PO-1050
(5/69)

UNITED STATES PATENT OFFICE
CERTIFICATE OF CORRECTION

Patent No. 3,444,026        Dated May 13, 1969

Inventor(s) Dwight E. Peerman

It is certified that error appears in the above-identified patent and that said Letters Patent are hereby corrected as shown below:

Column 1, line 61, delete "polymeric" and insert -- "polymeric fat acid" refers to a polymerized fat acid. The term --.
Column 1, line 68, after "acids" insert -- trimerized fat acids and higher polymers of fat acids, respectively. These divalent and trivalent radicals are referred to herein as "dimeric fat radical" and " --.
Column 2, line 8, delete "captylic" and insert -- caprylic --.
Column 2, line 22, delete "palyitoleic" and insert -- palmitoleic --.
Column 2, line 26, delete "timodonic" and insert -- timnodonic --.
Column 5, line 41, delete "substrats" and insert -- substrates --.
Column 6, line 18, after "under" insert -- pressure --.
Column 8, in the first table, delete "3.9" and insert -- 3.0 --.
Column 8, line 42, after "property" insert -- or privilege --.
Column 8, line 45, delete "chlorosulfunated" and insert -- chlorosulfonated --.
Column 8, line 46, after "adhesive" insert -- composition --.
Column 8, line 65, delete "6" and insert -- 3 --.
Column 8, line 73, delete "$H_2R'''$ $NH_2$" and insert -- $H_2NR'''$ $NH_2$ --.
Column 9, line 22, after "amine" insert -- number --.
Column 9, line 30, delete "$H_2NR''''NH_2$" and insert -- $H_2NR'''$ $NH_2$ --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents